United States Patent
Isokangas et al.

(10) Patent No.: US 9,510,356 B2
(45) Date of Patent: Nov. 29, 2016

(54) MECHANISM FOR CONTROLLING MULTI-BAND COMMUNICATION

(71) Applicant: BROADCOM CORPORATION, Irvine, CA (US)

(72) Inventors: Jari Isokangas, Tampere (FI); Wei Hong, Beijing (CN); Haiming Wang, Beijing (CN); Na Wei, Beijing (CN); Antti Oskari Immonen, Helsinki (FI); Jouni Kristian Kaukovuori, Vantaa (FI)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/431,841

(22) PCT Filed: Sep. 28, 2012

(86) PCT No.: PCT/CN2012/082370
§ 371 (c)(1),
(2) Date: Mar. 27, 2015

(87) PCT Pub. No.: WO2014/047894
PCT Pub. Date: Apr. 3, 2014

(65) Prior Publication Data
US 2015/0245365 A1 Aug. 27, 2015

(51) Int. Cl.
*H04W 24/00* (2009.01)
*H04W 72/08* (2009.01)
*H04W 72/12* (2009.01)
*H04L 5/00* (2006.01)
*H04W 28/04* (2009.01)

(52) U.S. Cl.
CPC .......... *H04W 72/082* (2013.01); *H04L 5/0096* (2013.01); *H04W 28/048* (2013.01); *H04W 72/1226* (2013.01); *H04W 72/1284* (2013.01)

(58) Field of Classification Search
CPC .................................................. H04W 72/082
USPC .......................................................... 455/423
See application file for complete search history.

(56) References Cited

U.S. PATENT DOCUMENTS

2012/0020231 A1   1/2012   Chen et al.

FOREIGN PATENT DOCUMENTS

WO       2012 010104       1/2012

OTHER PUBLICATIONS

International Search Report Issued Feb. 28, 2013 in PCT/CN12/82370 Filed Sep. 28, 2012.

*Primary Examiner* — Thomas Lett
(74) *Attorney, Agent, or Firm* — Oblon, McClelland, Maier & Neustadt, L.L.P.

(57) ABSTRACT

There is proposed a mechanism for controlling communications conducted in multiple frequency bands, in particular for controlling interference caused by intermodulation distortion. When the UE obtains information that an interference caused by an intermodulation distortion produced by a set of first communications performed on at least a first and a second frequency and a second communication performed on a third frequency is present, an indication to the eNB for indicating that an interference situation caused by intermodulation distortion exists. The eNB receiving this indication is enabled to acquire parameters related to the interference situation caused by the intermodulation distortion, and to control, on the basis of the acquired parameters, a communication with the UE by changing communication properties for reducing the interference caused by intermodulation distortion.

20 Claims, 9 Drawing Sheets

MECHANISM FOR CONTROLLING MULTI-BAND COMMUNICATION

BACKGROUND OF THE INVENTION

Field of the Invention

The present invention relates to a mechanism for controlling communications conducted in multiple frequency bands. In particular, the present invention is directed to apparatuses, methods and a computer program product providing a mechanism for controlling interference caused by IMD so that communications conducted for example in an in-device co-existence scenario suffer less interferences from each other.

Related Background Art

Prior art which is related to this technical field can e.g. be found in technical specifications according to 3GPP TR 36.816 (e.g. version 11.2.0).

The following meanings for the abbreviations used in this specification apply:
BS: base station
BT: Bluetooth
BW: bandwidth
CA: carrier aggregation
CC: component carrier
CE: control element
CPU: central processing unit
DL: downlink
DRX: discontinuous reception
eNB: evolved node B
FDM: frequency division multiplex
GNSS: global navigation satellite system
GPS: global positioning system
H3: $3^{rd}$ order harmonic distortion
IDC: in-device co-existence
IE: information element
IMD: intermodulation distortion
IP: Internet protocol
ISM: industrial, scientific, medical
LTE: Long Term Evolution
LTE-A: LTE Advanced
MAC: medium access control
MCS: modulation and coding scheme
Pcell: primary cell
PDU: protocol data unit
P-MPR: power management power reduction
PRB: physical resource block
PSD: power spectral density
RAT: radio access technology
RB: resource block
RF: radio frequency
RX: receiver
Scell: secondary cell
STA: station
TDM: time division multiplex
TX: transmission, transmitter
UE: user equipment
UL: uplink
VoIP: voice over IP
WiFi: wireless fidelity
WLAN: wireless local access network In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between communication elements such as a UE and another communication element or UE, a database, a server, etc., one or more intermediate network elements such as communication network control elements, access nodes, support nodes or service nodes are involved which may belong to different communication networks.

In order to allow users to access to various networks and services ubiquitously, an increasing number of UEs are equipped with multiple radio transceivers. For example, a UE may be equipped with LTE, WiFi, and Bluetooth transceivers, as well as GNSS/GPS receivers, and the like.

However, such a configuration may result in more complicated interference situations due to coexistence interference between those collocated (radio) transceivers. For example, due to extreme proximity of multiple radio transceivers within the same UE, the transmit power of one transmitter may be much higher than the received power level of another receiver.

Conventionally, it is tried by using filter technologies and sufficient frequency separation to avoid significant interference resulting from a transmit signal. However, for some coexistence scenarios, e.g. different radio technologies within the same UE operating on adjacent frequencies, current state-of-the-art filter technology might not provide sufficient rejection. Therefore, solving the interference problem by single generic RF design may not always be possible so that alternative methods have to be considered.

SUMMARY OF THE INVENTION

Some examples of embodiments of the invention provide an apparatus, method and computer program product by means of which an improved mechanism for controlling communications conducted in multiple frequency bands is provided. In particular, some examples of embodiments of the present invention provide apparatuses, methods and a computer program product implementing a mechanism for controlling interference caused by IMD so that communications conducted for example in an IDC scenario suffer less interferences from each other.

This is achieved by the measures defined in the attached claims.

According to some examples of embodiments of the proposed solution, there is provided, for example, a method comprising obtaining an information that an interference caused by an intermodulation distortion produced by a set of first communications performed on at least a first and a second frequency and a second communication performed on a third frequency is present, preparing an indication element for indicating that an interference situation caused by intermodulation distortion exists, and causing transmission of the indication element to a communication network in which at least one of the set of first communications and the second communication is conducted.

Furthermore, according to some examples of embodiments of the proposed solution, there is provided, for example, an apparatus comprising at least one processor; and at least one memory including computer program code; wherein the at least one memory and the computer program code are configured, with the at least one processor, to cause the apparatus at least to perform an interference information obtaining function configured to obtain an information that an interference caused by an intermodulation distortion produced by a set of first communications performed on at least a first and a second frequency and a second communication performed on a third frequency is present, an indication element preparation function configured to prepare an indication element for indicating that an interference situation caused by intermodulation distortion exists, and a transmission function configured to cause transmission of the indication element to a communication network in which at least one of the set of first communications and the second communication is conducted.

In addition, according to some further examples of embodiments of the proposed solution, there is provided, for example, a method comprising receiving an indication element for indicating that an interference situation caused by intermodulation distortion exists for a communication element communicating via a set of first communications performed on at least a first and a second frequency and a second communication performed on a third frequency, processing the indication element for acquiring parameters related to the interference situation caused by the intermodulation distortion, and controlling, on the basis of the acquired parameters, a communication with the communication element by changing communication properties for reducing the interference caused by intermodulation distortion.

Furthermore, according to some further examples of embodiments of the proposed solution, there is provided, for example, an apparatus comprising at least one processor; and at least one memory including computer program code; wherein the at least one memory and the computer program code are configured, with the at least one processor, to cause the apparatus at least to perform a receiving function configured to receive an indication element for indicating that an interference situation caused by intermodulation distortion exists for a communication element communicating via a set of first communications performed on at least a first and a second frequency and a second communication performed on a third frequency, a processing function configured to process the indication element for acquiring parameters related to the interference situation caused by the intermodulation distortion, and a controlling function configured to control, on the basis of the acquired parameters, a communication with the communication element by changing communication properties for reducing the interference caused by intermodulation distortion.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide an apparatus, method and computer program product by means of which an improved mechanism for controlling communications conducted in multiple frequency bands is provided. In particular, according to some examples of embodiments of the present invention, it is possible provide apparatuses, methods and a computer program product which enable an improved control for reducing an interference caused by IMD in a multi-frequency band communication scenario wherein according to some examples of embodiments in particular the IMD problem in IDC cases can be overcome with high efficiency. Furthermore, it is possible to inform a communication network control element, such as an eNB of an LTE or LTE-A communication network, about the possibility or presence of an interference caused by IMD so as to enable the communication network control element to make suitable decisions for reducing/avoiding such an interference in due time and as soon as possible. Moreover, proper counter measures can be taken, such as a re-scheduling of communications in UL/DL direction, while unnecessary measures, such as a concurrent ON/OFF switching of communications e.g. from a Pcell and a Scell can be avoided.

The above and still further objects, features and advantages of the invention will become more apparent upon referring to the description and the accompanying drawings.

DESCRIPTION OF PREFERRED EMBODIMENTS

Figure 1:
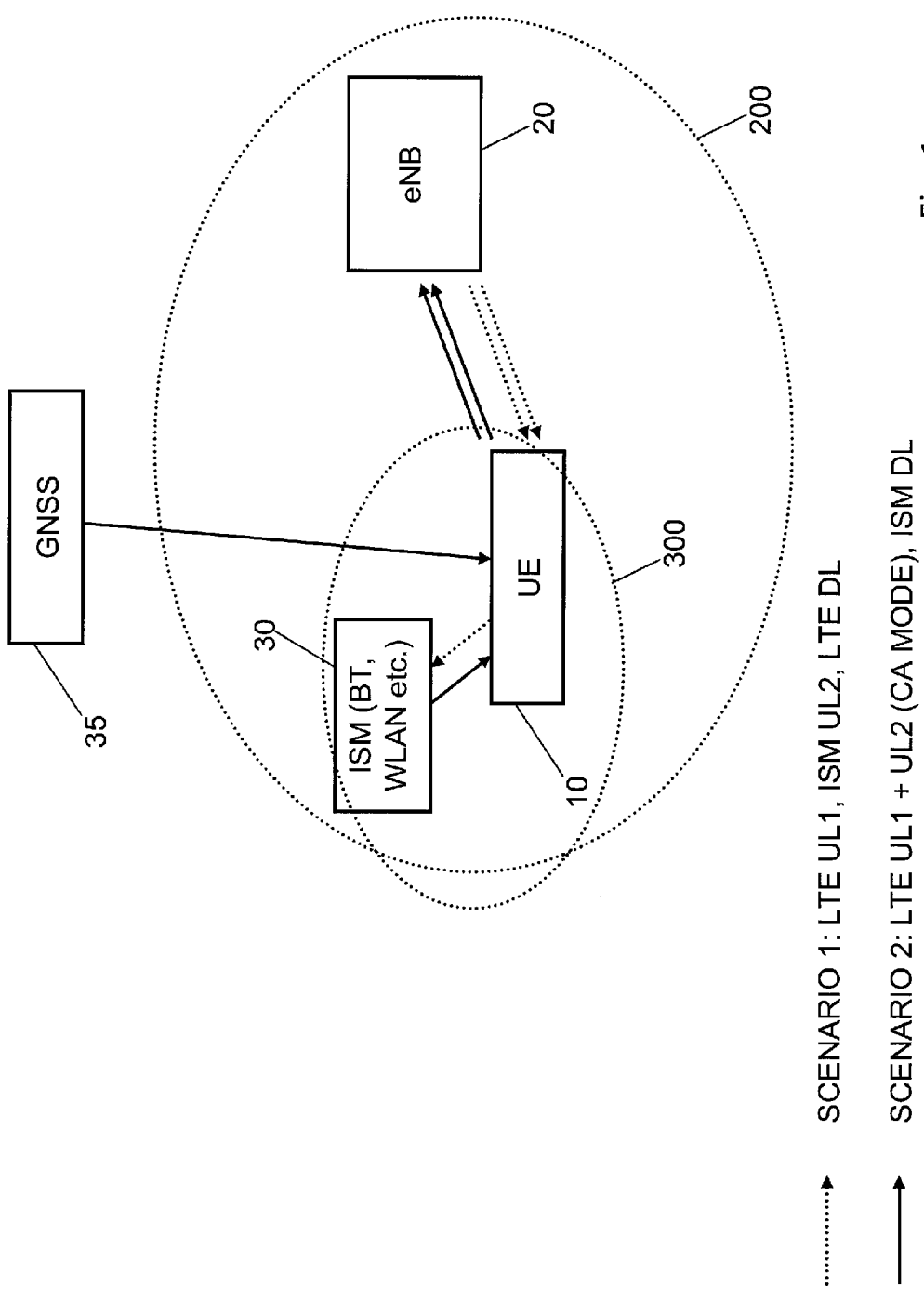
FIG. 1 shows a diagram illustrating a communication network structure in which some examples of embodiments of the invention are applicable.

In the following, examples and embodiments of the present invention are described with reference to the drawings. For illustrating the present invention, the examples and embodiments will be described in connection with a cellular communication network based on a 3GPP LTE or LTE-A system wherein at least one further communication access is provided with which a UE can conduct a communication, such as an ISM network or a GSNN system. However, it is to be noted that the present invention is not limited to an application using such types of communication systems, but is also applicable in other types of communication systems and the like as long as interferences between communications may occur.

A basic system architecture of a communication network where examples of embodiments of the invention are applicable may comprise a commonly known architecture of one or more communication systems comprising a wired or wireless access network subsystem and a core network. Such an architecture may comprise one or more access network control elements, radio access network elements, access service network gateways or base transceiver stations, such as a BS or eNB, which control a coverage area also referred to as a cell and with which a communication element or device such as a UE or another device having a similar function, such as a modem chipset, a chip, a module etc., which can also be part of a UE or attached as a separate element to a UE, or the like, is capable to communicate via one or more channels for transmitting several types of data. Furthermore, core network elements such as gateway network elements, policy and charging control network elements, mobility management entities and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element like a UE or a communication network control element like an eNB or a server etc., besides those described in detail herein below.

Furthermore, the described network elements, such as communication elements like UEs, communication network control elements like BSs, eNBs, servers and the like, as well as corresponding functions as described herein may be implemented by software, e.g. by a computer program product for a computer, and/or by hardware. In any case, for executing their respective functions and/or algorithms, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy disc, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

With regard to FIG. 1, a diagram illustrating a general configuration of a communication network is shown where some examples of embodiments of the invention are applicable. It is to be noted that the structure indicated in FIG. 1 shows only those devices, network elements and parts which are useful for understanding the principles underlying some examples of embodiments of the invention. As also known by those skilled in the art there may be several other network elements or devices involved in a connection between the communication element (UE) and the respective networks which are omitted here for the sake of simplicity.

In FIG. 1, reference sign 10 denotes a communication element such as a UE or the like which is capable of communicating with different kinds of communication networks or devices, for example via carriers belonging to different frequency bands.

Reference sign 20 denotes a communication network control element such as a BS or eNB controlling a communication area or cell (indicated by dashed circle 200). It is to be noted that there may be several cells in the communication network which are controlled, for example, by the communication network control element 20 or by additional communication network control elements (not shown), such as other BSs or eNBs.

According to some examples of embodiments of the invention, the UE 10 communicates with the eNB 20 via one or more communications (carriers etc., illustrated in FIG. 1 by solid and dashed arrows in UL and DL direction, wherein it is to be noted that the illustrated directions are related to the connections and flows to which some examples of embodiments of the invention are related, while for the overall communication flows are also bi-directional). For example, carrier aggregation (CA) is implemented in some examples of embodiments of the invention, wherein for example two (or more) UL communications with the eNB 20 are established.

Furthermore, according to some examples of embodiments of the invention, different communication accesses, networks or systems are present with which the UE 10 communicates in parallel to the communications conducted with the eNB 20 (indicated by solid and dashed arrows to and from elements 30 and 35). For example, a communication system 30 using an ISM band, such as a BT or WLAN/WiFi system, is provided, e.g. in the form of a corresponding server and transceiver with which the UE 10 communicates in UL and/or DL direction. Another example for an alternative communication system is a GNSS (or other positioning) system 35 having plural transmitters e.g. in satellites which send signals for conducting a positioning operation (indicated by an arrow in DL direction).

As indicated above, in order to allow the UE 10 to ubiquitously access the various networks or communication systems and services as indicated in FIG. 1, according to some examples of embodiments of the invention, the UE 10 is equipped with multiple radio transceivers. For example, in the configuration example as shown in FIG. 1, it is assumed that the UE 10 has a configuration as depicted, for example, in FIG. 2.

Figure 2:
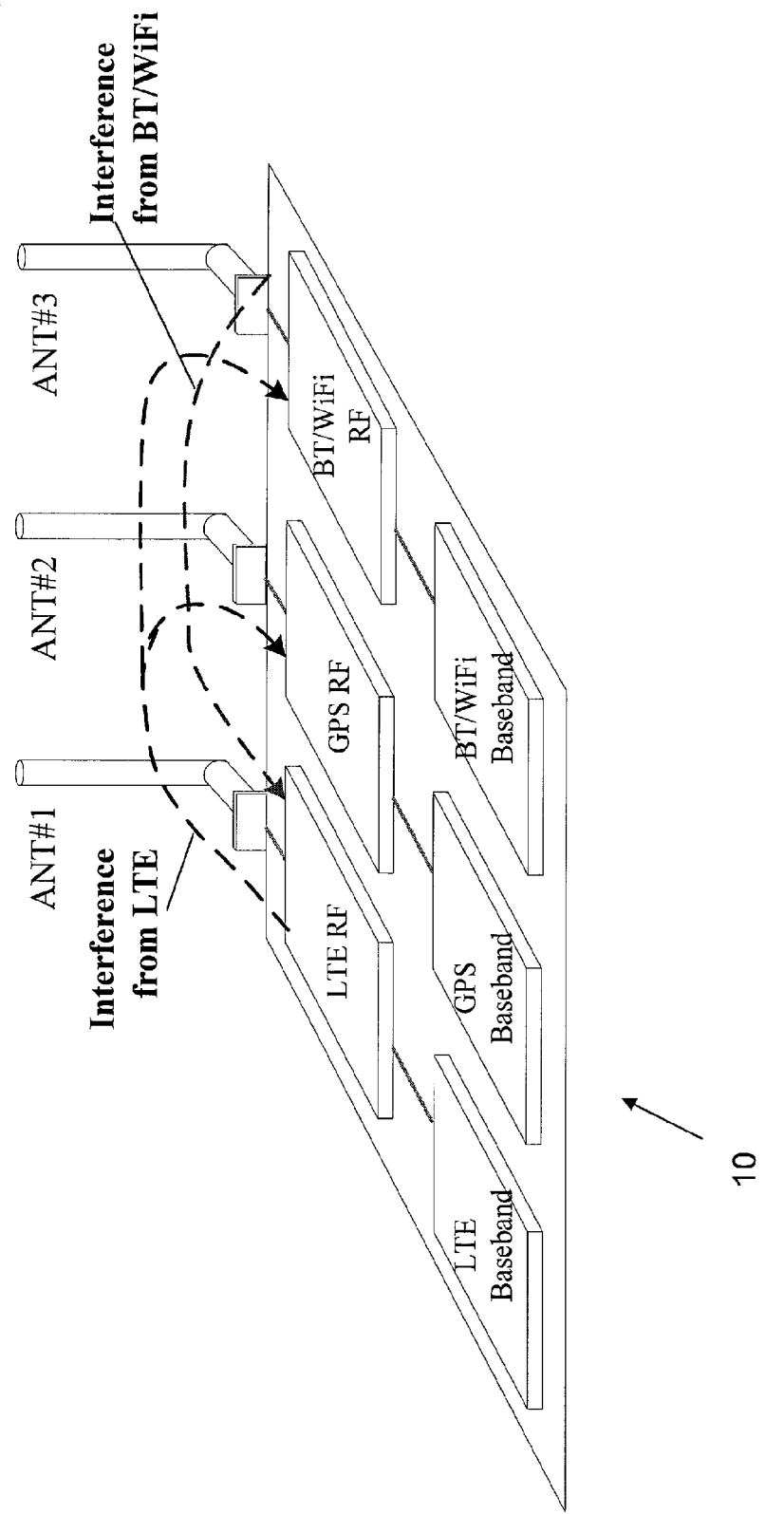
FIG. 2 shows a block circuit diagram illustrating a configuration of a communication element with an indication of interferences caused by different communications.

As indicated in FIG. 2, according to some examples of embodiments of the invention, the UE 10 is equipped with plural transceiver/antenna configurations, for example a transceiver/antenna configuration connected to ANT#1 used for communications with the eNB 20 (referred to as LTE based communications, which however also applies generally for LTE-A based communications), a receiver/antenna configuration connected to ANT#2 used for communications with the GNSS or GPS system 35 (referred to as GPS based communications), and a transceiver/antenna configuration connected to ANT#3 used for communications with the ISM based server 30 (referred to as WLAN/BT based communication).

In FIG. 2, examples for coexistence interference which may be generated between those collocated radio transceivers are indicated by dashed arrows. That is, due to the proximity of the multiple radio transceivers within UE 10, as indicated in FIG. 2, a situation may arise in which the transmit power of one transmitter may be much higher than the received power level of another transceiver/receiver. Hence, interference from the LTE (or LTE-A) based communications to the GPS based communication and/or the WLAN/BT based communication may arise, while on the other hand also interference from the WLAN/BT communication to the LTE (or LTE-A) based communication may occur.

For example, possible use cases of a concurrent communication via coexisting transmitters comprises an LTE based communication and a BT based communication (e.g. BT earphone in VoIP service or mMultimedia service), an LTE based communication and a WLAN based communication (e.g. WiFi portable router or WiFi offload), an LTE based communication and a GNSS based communication (e.g. GNSS receiver), etc.

Figure 3:
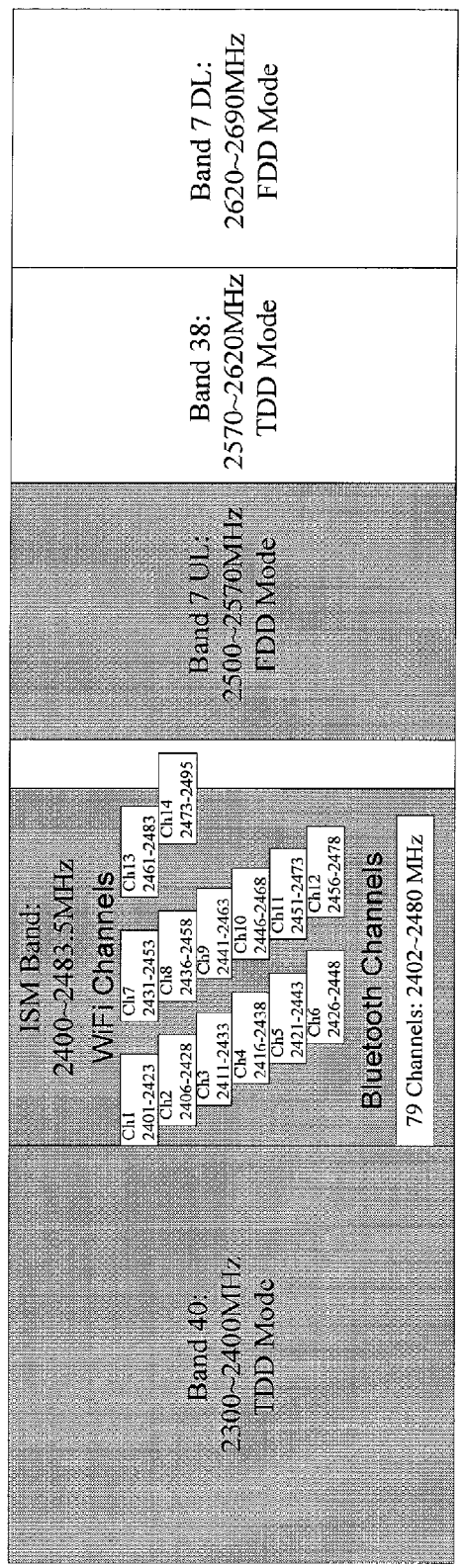
FIG. 3 shows a diagram illustrating a distribution of frequency bands for different types of communications.

FIG. 3 provides an overview of a distribution of frequency spectra in different communication systems according to some examples of embodiments of the invention. Specifically, LTE communication bands such as Band 40, Band 7 (UL and DL), Band 38, and ISM communication bands such as WiFi channels and BT channels are indicated in relation to each other by referring to their respective frequency ranges. For example, as shown in FIG. 3, LTE band 7 (or LTE B7) in UL operates in a frequency area of 2500-2570 MHz while WiFi (WLAN) channels can extend up to 2483 MHz or even 2495 MHz (e.g. in Japan).

Due to the proximity of the respective frequency ranges, or even overlapping thereof, distortion and desense on at least one of the communications can be the result when communications are conducted concurrently in respective frequencies. For example, a simultaneous transmission at two different frequencies can cause intermodulation products to appear as interference at a different frequency. Intermodulation distortion (IMD) can occur on various RF front-end components (e.g. antennas, power amplifier, etc). The reverse intermodulation (the leakage from one transmitter amplifier output is mixed with the input signal of another amplifier) is problematic, for example, when two signals are transmitted concurrently while two closely located transmitters (see e.g. FIG. 2) are utilized.

For example, in the case of ISM and LTE B7 communications and a concurrent transmission thereon, it has been found out that that for LTE B7 intermodulation effects can cause problems in certain carriers. Thus, for example, the UE's DL reception is impacted when ISM and LTE UL transmission overlap in time. Specifically, for example, ISM activities (e.g. WLAN communication) in the frequency of 2400-2420 MHz can cause IMD caused interference falling into the LTE DL channel of 2620-2640 MHz, while ISM activities in the frequency 2400-2440 MHz can cause IMD caused interference falling into the LTE DL channel of 2620-2660 MHz. Furthermore, ISM activities in the frequency of 2410-2470 MHz can cause IMD caused interference falling into the LTE DL channel of 2630-2690 MHz.

Figure 4:
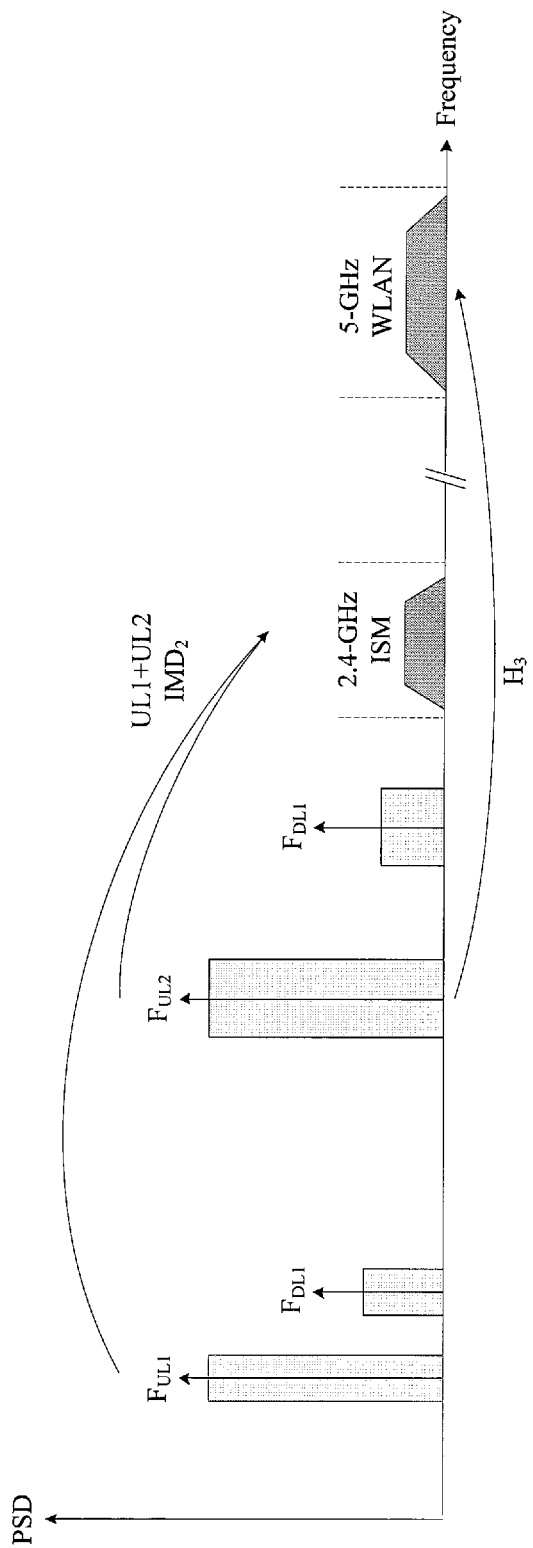
FIG. 4 shows a diagram illustrating examples of interferences caused by communications via different frequency bands.

FIG. 4 shows a further diagram illustrating examples of interferences caused by communications via different frequency bands in a communication network configuration as indicated, for example, in FIG. 1. In detail, FIG. 4 illustrates examples of 3GPP CA scenarios causing H3 and $2^{nd}$ order intermodulation interferences in non-3GPP bands (here, ISM-band of 2.4 and 5 GHz, for example).

Specifically, different frequency bands providing frequency ranges used for UL communications, that is two UL communications UL1 and UL2 with frequencies $F_{UL1}, F_{UL2}$, and for DL communications, that is two DL communications DL1 and DL2 with frequencies $F_{DL1}, F_{DL2}$, are shown which are used e.g. for LTE-A based communications between the UE 10 and the eNB 20 as shown in FIG. 1, wherein the power of the UL communications is assumed to be higher than that of the DL communications (indicated by the PSD value of the respective frequency range blocks). Furthermore, ISM and WLAN bands at 2.4 GHz and 5 GHz ranges are shown. As indicated by the arrows, a 2nd order intermodulation distortion ($IMD_2$) is caused by the two UL communications at the 2.4 GHz ISM-band, and a 3rd order harmonic distortion H3 is caused by either of the UL communications (here UL communication UL2) at the 5 GHz band. That is, when referring back to the bands indicated in FIG. 3, for example, this would lead to a result where in case of B4+B12 band usage, the 2nd order intermodulation distortion (due to UL1+UL2) would cause desense on the 2.4-GHz ISM band and 3rd order harmonic of UL2 (B4) would hit on the 5-GHz WLAN band.

Basically, there are several approaches conceivable for handling the interference problems indicated above. For example, according to a comparative example, a TDM solution based on DRX mechanism, FDM solutions, autonomous denial, etc. could be seens as options for solving this. For example, an approach based on power backoff on the LTE UL communication is conceivable, but it is difficult to calculate how much power backoff on the LTE UL is required to overcome the interference problem so that a P-MPR approach is possibly not applicable. Furthermore, power backoff on the LTE UL communication can also cause a performance loss in case the eNB is not awarene thereof.

Another approach according to a comparative example for handling interference problems in IDC scenarios is that the UE chooses one UL communication to deny, which is also referred to as an autonomous denial. However, autonomous denial is considered in several communication networks as a solution allowed only for rare cases, e.g. if other solutions can not be used, which means that autonomous denial is to be used within limited cases.

Another approach according to a comparative example for handling interference problems is based on DRX which is as a method used, for example, in TDM cases for IDC problems. However, according to specifications of some communication networks, such as of 3GPP based networks according to release 11, DRX setting is to be common for e.g. both Pcell and Scell, so that both Pcell and Scell are to be switched ON/OFF together according to the DRX pattern, which in turn means a significant waste of resources and a low efficiency.

Hence, according to some examples of embodiments of the invention, further ways for handling the interference problems in multi-frequency communications as described above are provided which allow, for example, to efficiently solve in particular the IMD problem under current IDC agreement.

According to some examples of embodiments of the invention, when it is determined that an interference situation is present which is caused by an IMD between different communications conducted by e.g. a UE or the like, the UE sends an indication to the network (e.g. the communication network control element like the eNB) to inform about the interference situation, i.e. that an IDC problem is caused by IMD (e.g. in the form of a new cause code). In other words, when the UE obtains information regarding an IMD caused interference, a corresponding indication is sent to the eNB. The indication is, according to some examples of embodiments of the invention, a new content added in an IDC indication signaling to indicate the IDC problem is caused by IMD. Alternatively, the indication is, according to some other examples of embodiments of the invention, comprised in a signaling independent from an IDC indication RRC signaling, such as a new MAC CE or a new L1 signaling.

According to some examples of embodiments of the invention, in the new content added e.g. in the IDC indication signaling, information is provided to explicitly indicate that the IMD is caused by a specific combination of communications, for example that the IMD is a LTE+non 3GPP RAT or LTE IMD.

Moreover, according to some examples of embodiments of the invention, parameters and/or further information are provided with the indication for informing about the interference situation.

For example, according to some examples of embodiments of the invention, in a scenario where a communication in UL direction comprises simultaneous communications to different networks, such as a LTE B7 UL transmission and an ISM UL transmission, which cause an IMD interference to a DL communication, e.g. a LTE B7 DL reception, the indication comprises a new content (added e.g. in the IDC indication signaling) to indicate the precise interferenced PRB ranges and the interferencing frequency (together with the new cause code value), so as to inform for example the eNB about the resource location of interfered DL resources and interfering UL resource implicitly. As indicated above, according to some examples of embodiments of the invention, the IMD interfered PRB ranges, the interferencing frequency and the IMD interference indication content can be signalled to the eNB by means of a new MAC CE or a new L1 signaling independent from an IDC indication RRC signaling.

On the other hand, according to some other examples of embodiments of the invention, in a scenario where a communication in the UL direction comprises two (or more) simultaneous UL transmissions with one network (e.g. two LTE UL transmissions) which cause an IMD interference to a communication with another network (e.g. an ISM DL reception), the UE can also inform the eNB in a manner as described above. Furthermore, similar to the above examples, parameters and information related to the IMD interference can be provided. Furthermore, according to some examples of embodiments of the invention, alternative scheduling patterns are proposed, for example, an UL scheduling pattern for a Scell, according to the ISM DL activity at the UE.

Referring back to FIG. 1, for illustrating some examples of embodiments of the invention, different scenarios with respective communications are indicated.

Specifically, as a scenario 1, which is indicated by dashed arrows in FIG. 1, it is assumed that the UE 10 conducts a communication in UL direction simultaneously with different networks, i.e. a LTE UL communication to the eNB 20 (e.g. an LTE B7 UL transmission) and a WLAN UL communication with ISM server 30, while at the same time a LTE DL communication (e.g. LTE B7 DL reception) suffers an IMD interference. The communication control procedure according to some examples of embodiments of the invention in this scenario 1 is described below.

As described above, the UE 10 receives DL traffic from the eNB 20 and transmits to a served WiFi STA, such as ISM (WLAN) server/transceiver 30.

After e.g. a WiFi module (see FIG. 2) of the UE 10 occupies a WiFi channel towards server 30, the UE 10 calculates a potential interferene on the LTE DL communication, e.g. the LTE B7 DL. In case the UE determines a (potential) interference, e.g. when at least a part of its DL operating frequency is interfered by the UL communications, the UE 10 starts to decide whether this interference is caused by IMD.

According to some examples of embodiments of the invention, the decision regarding IMD caused interference is based on a modification of communication properties of the UL communications and a comparison between measured or calculated interference levels before and after the modification. In communication systems where diversity receiver is used, the IMD can usually be easier noticed in the main receiver branch.

For example, in some examples of embodiments of the invention, the UE 10 tries to find out that the interference situation is caused by an IMD interference by conducting at least one of the following procedures:
1) reducing UL transmitting power on one of the UL communications (e.g. the LTE UL carrier or the ISM channel) and compare the interference level on the DL communication (e.g. the LTE B7 DL) before and after the power reduction;
2) delay the transmission on one of the UL communications (e.g. in the ISM band or on the LTE UL carrier) and compare the interference level on the DL communication (e.g. the LTE B7 DL) before and after the delay;
3) choose another channel for UL communication (e.g. another UL ISM channel) and compare the interference level on the DL communication (e.g. the LTE B7 DL) before and after the channel switch.

In case it is decided that the interference is caused by IMD (e.g. on the basis of the above described modification/comparison processing), the UE 10 sends an indication to the eNB 20, e.g. by a new IIF signaling to the eNB to notify it about the IMD interference separately or in an IDC indication message, wherein further parameters such as a precise indication of the frequency interfered by the IMD is included (also MAC CE or L1 signaling independent of IDC indication RRC signaling are used in some examples of embodiments of the invention). As indicated above, in some examples of embodiments of the invention, further parameters and information are provided with the indication to the eNB, such as information about the precise interferenced PRB ranges and the interferencing frequency, together with the new cause value, to let the eNB 20 know the resource location of interfered DL resources and interfering UL resource implicitly.

After receiving the indication regarding interference caused by IMD, and the further parameters/information indicated above, the eNB 20 controls in some examples of embodiments of the invention the communications conducted with the UE 10 so as to reduce the interference level. For this, the parameters derived from the indication, such as frequency and PRBs are useful. For example, in some examples of embodiments of the invention, the eNB conducts at least one of the following processings:

1) the DL communication (e.g. in LTE B7 DL) is scheduled with lower MCS;
2) the communication with the UE 10 in the corresponding band (e.g. in LTE B7) is configured as an Scell communication, wherein a simultaneous transmission with the ISM communication (WiFi communication) is avoided by using pre-defined rules and scheduling restriction, in case the UE 10 is working under CA mode;
3) an UL power control procedure is conducted so as to achieve a tradeoff between the communications;
4) the DL communication is scheduled in resources which are free of IMD interferences, even in case of a planned DRX OFF mode.

Other control processings are also possible as long as a reduction of interference caused by IMD is achievable thereby.

A structure of an indication of the interference situation according to some examples of embodiments of the invention is indicated below. Specifically, an example for a structure of the indication when using an IDC indication with new content is described. The IDC indication is transmitted from the UE 10 to the eNB 20 for reporting about the IDC properties and status. According to some examples of embodiments of the invention, the new contents regarding the interference indication are:

procedure according to some examples of embodiments of the invention in this scenario 2 is described below.

According to some examples of embodiments of the invention, in the scenario 2, when the UE 10 is working in the CA mode, it calculates the potential interfered ISM band.

In case the UE 10 finds that its ISM reception is interfered, it starts to decide whether this interference is cause by IMD.

For example, in some examples of embodiments of the invention, the UE 10 tries to find out that the interference situation is caused by an IMD interference by conducting at least one of the following procedures:

1) reducing UL transmitting power on one or both of the UL communications (e.g. the LTE UL carrier for UL1 communication and/or UL2 communication) and compare the interference level on the DL communication (e.g. the ISM DL) before and after the power reduction;
2) delay the transmission on one of the UL communications (e.g. on the LTE UL carrier UL1) and compare the interference level on the DL communication (e.g. the ISM DL) before and after the delay.

In case it is decided that the interference is caused by IMD (e.g. on the basis of the above described modification/comparison processing) from the two (or more) UL communications (e.g. the LTE UL1/UL2 communications), the UE 10 sends an indication to the eNB 20, e.g. in an IDC indication, wherein further parameters such as an interfering

```
- "IMD" in the interferedSide-r11 part;
- ..imdInterferedPRBs-r11        InterferedPRBRange-r11          OPTIONAL";
- ..ul-Scheduling-Pattern-r11    SEQUENCE {
    ul-Scheduling-Pattern-r11                BITSTRING (SIZE (10))".
InDeviceCoexIndication-r11-IEs ::=   SEQUENCE {
   interferedSide-r11 ENUMERATED {eutra, other, both, IMD, spare}      OPTIONAL,
   affectedCarrierFreqList-r11   CarrierFreqList-r11             OPTIONAL,
   imdInterferedPRBs-r11         InterferedPRBRange-r11          OPTIONAL,
   availableMeasurementResults-r11   AvailaIeMeasurementResults-r11
   OPTIONAL,
   tdm-AssistanceInfo-r11        TDM-AssistanceInfo-r11          OPTIONAL,
   lateNonCriticalExtension      OCTET STRING                    OPTIONAL,
   nonCriticalExtension          SEQUENCE { }                    OPTIONAL
}
TDM-AssistanceInfo-r11 ::=       CHOICE {
   drx-AssistanceInfo-r11           SEQUENCE {
      drx-CycleLength-r11              ENUMERATED {FFS},
      drx-Offset-r11                   ENUMERATED {FFS},
      drx-ActiveTime-r11               ENUMBERATED {FFS}
   },
   idc-SubframePattern-r11          SEQUENCE {
      idc-SubframePatternList-r11      IDC-SubframePatternList-r11
   },
   ul-Scheduling-Pattern-r11        SEQUENCE {
      ul-Scheduling-Pattern-r11        BITSTRING (SIZE (10)),
   },
   ...
}
```

Referring back to FIG. 1, in some other examples of embodiments of the invention, as a scenario 2, which is indicated by solid arrows in FIG. 1, it is assumed that the UE 10 conducts a communication in UL direction in CA mode with one network, e.g. the LTE network (e.g. with two carriers to the eNB 20 or to another transceiver/scell, like a remote radio head or the like), i.e. a LTE UL communications UL1 and UL2 to the eNB 20 and a WLAN DL communication with ISM server 30 which suffers an IMD interference (see e.g. FIG. 4). The communication control frequency by IMD and the interference source, IMD indication (cause code), and a recommended UL scheduling pattern (e.g. for an Scell) according to DL activity (e.g. in ISM communication) are included (also MAC CE or L1 signaling independent of IDC indication RRC signaling are used in some examples of embodiments of the invention).

After receiving the indication regarding interference caused by IMD, and the further parameters/information indicated above, the eNB 20 controls in some examples of embodiments of the invention the communications conducted with the UE 10 so as to reduce the interference level.

For this, the parameters derived from the indication, such as the recommended UL scheduling pattern, frequency information etc. are useful. For example, in some examples of embodiments of the invention, the eNB conducts at least one of the following processings:

1) de-active Scell to ensure ISM transmission/reception;
2) use the recommended UL scheduling pattern for Scell, while a communication via the Pcell continues TX/RX as usual.

Figure 5:
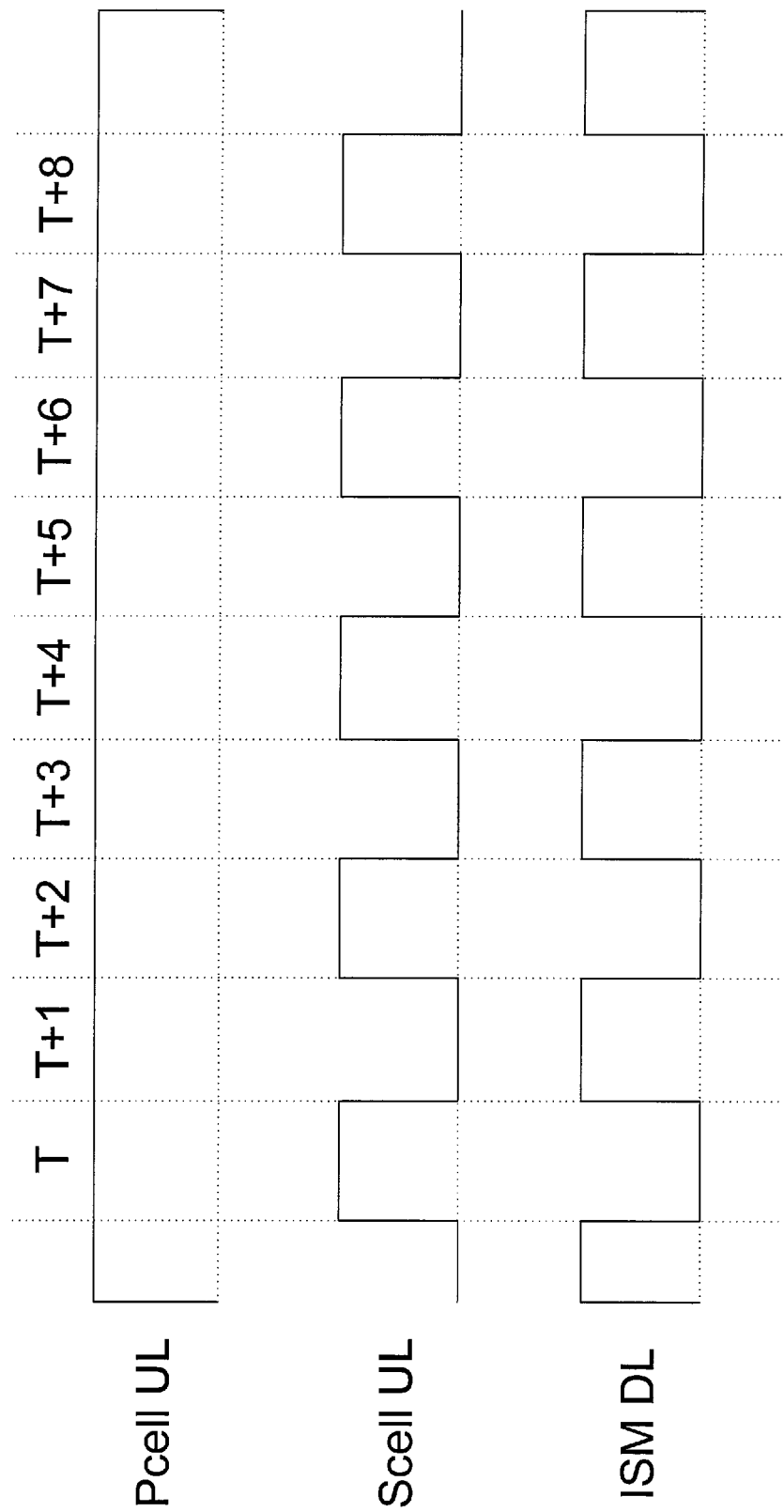
FIG. 5 shows a diagram illustrating a scheduling pattern for reducing interference caused by IMD according to some examples of embodiments of the invention.

FIG. 5 shows a diagram illustrating an example for a recommended scheduling pattern for reducing interference caused by IMD according to some examples of embodiments of the invention.

Specifically, FIG. 5 shows an ON/OFF timing of transmissions between the UE 10 and the eNB 20 (in CA mode from Pcell and Scell) in accordance with a transmission timing for communication between the UE 10 and the server 30, for example (ISM reception). According to some examples of embodiments of the invention, the proposed UL scheduling pattern for the Scell indicates a changed transmission scheme for the Scell to be used by the eNB 20. Specifically, at a time T, the Scell and Pcell can communicate in TX/RX direction without limitation. At time T+1, the Pcell can still communicate in the TX/RX direction without limitation, and the Scell DL can transmit without limitation, while a corresponding UL channel such as PUCCH transmits on the Pcell according to current agreement. On the other hand, the Scell UL does not transmit (i.e. is not scheduled). By means of this, it is ensured that there is no IMD interference to the ISM DL. This pattern is repeated for T+3, T+5 etc.

By means of this, according to examples of embodiments of the invention, the Pcell and Scell are not controlled to be switched ON/OFF together when it is unnecessary (e.g. at T, T+2 etc.).

It is to be noted that the recommended UL scheduling pattern can be send by the UE 10 with the indication, or be derived at the eNB 20 from another source, e.g. a memory or the like, while the indication comprises only a corresponding identification of the pattern to be used.

Figure 6:
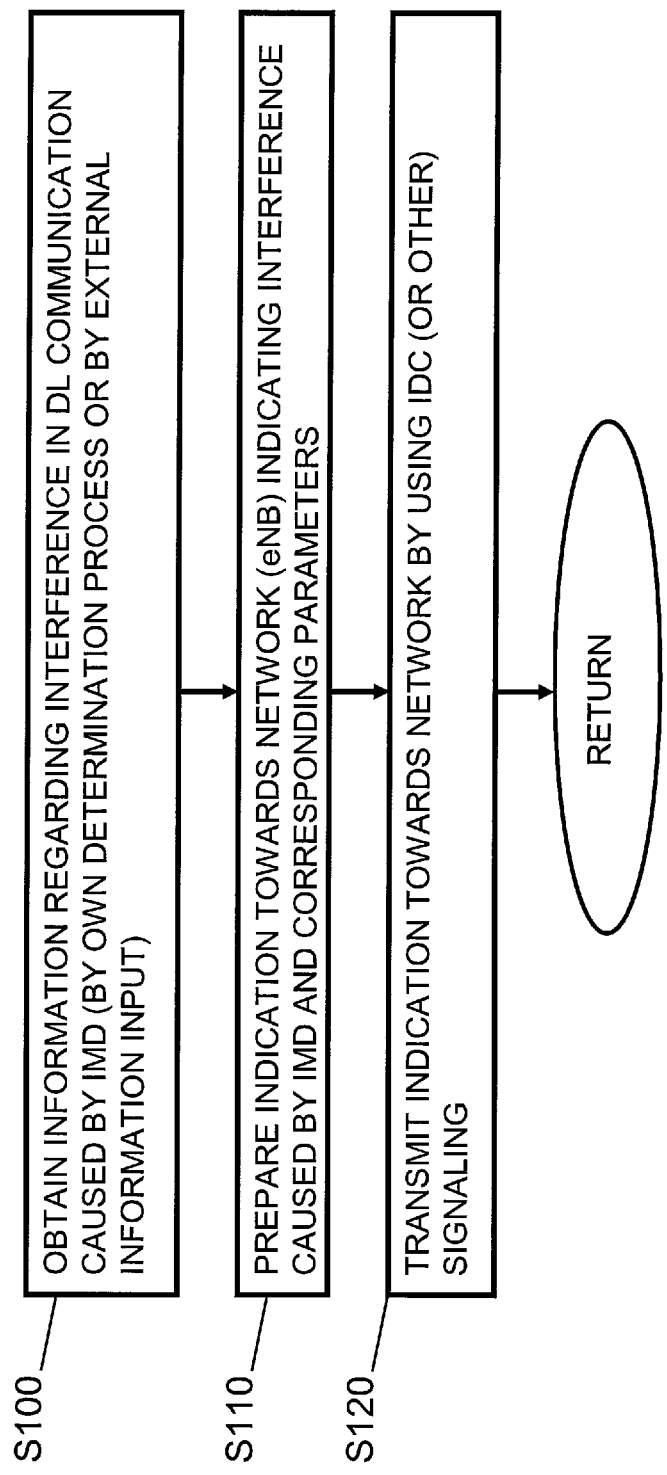
FIG. 6 shows a flowchart illustrating an interference control procedure conducted by a communication element according to some examples of embodiments of the invention.

FIG. 6 shows a flowchart illustrating a processing for conducting an interference control procedure in a communication network as shown e.g. in FIG. 1 according to some examples of embodiments of the invention.

Specifically, FIG. 6 shows a processing for controlling a corresponding communication and interference on the communication element side. The method in FIG. 6 is executed, according to some example embodiments of the invention, in a communication element like the UE 10.

In step S100, the UE 10 obtains an information that an interference caused by IMD produced by a set of first communications performed on at least a first and a second frequency and a second communication performed on a third frequency is present. The information is obtained on the basis of a determination procedure conducted e.g. on the UE 10 side, which comprises, according to examples of embodiments of the invention, a determination that an interference is (potentially) caused on at least one communication of the set of first communications and the second communication, a decision, in case it is determined that at least a part of the frequencies of the set of first communications and the second communications is interfered, whether the interference is caused by IMD produced between the set of first communications and the second communication, and a provision/determination, in case it is decided that the interference is caused by IMD produced between the set of first communications and the second communication, of further information or parameters which are necessary for preparing the indication element.

According to some examples of embodiments of the invention, in the information obtaining step S100, the decision regarding whether the interference is caused by IMD comprises a calculation of an interference level caused at an original setting of communication properties of the set of first communications and the second communication, a modification of the setting of the communication properties of the set of first communications and the second communication, an new calculation of the interference level caused at the modified setting of the communication properties of the set of first communications and the second communication, and a comparison of the interference level caused at the original setting and the interference level caused at the modified setting (the result of the comparison is used for deciding whether or not the interference is caused by the intermodulation distortion). In this context, according to some examples of embodiments of the invention, the modification of the setting of the communication properties of the set of first communications and the second communication comprises one of a reduction of a transmission power for an UL transmission via at least one communication of the set of first communications and the second communication, a delay of an uplink transmission via one communication of the set of first communications and the second communication, and a selection of a different channel for an uplink transmission via one communication of the set of first communications and the second communication.

In step S110, an indication element is prepared which indicates that an interference situation caused by IMD exists. The indication element is comprised for example in an IDC indication or a separate signaling (IIF signaling or the like) for indicating to the eNB 20 that an IMD caused interference is present. According to examples of embodiments of the invention, the indication element comprises as further information at least one of an information element specifying a cause of the interference due to IMD, an information element specifying a combination of communications causing the interference by IMD, an information element specifying a frequency or a frequency range being interfered by IMD, an information element specifying a range of PRB being interfered by IMD, an information element specifying a frequency range representing a source for the interference by IMD, and an information element specifying an alternative scheduling pattern for Scell UL data transmission to be used for mitigating the interference by the intermodulation distortion.

In step S120, the UE 10 transmits the indication element to the eNB 20.

It is to be noted that according to some examples of embodiments of the invention the set of first communications and the second communication are communication as described in connection with scenario 1 and 2, for example.

Figure 7:
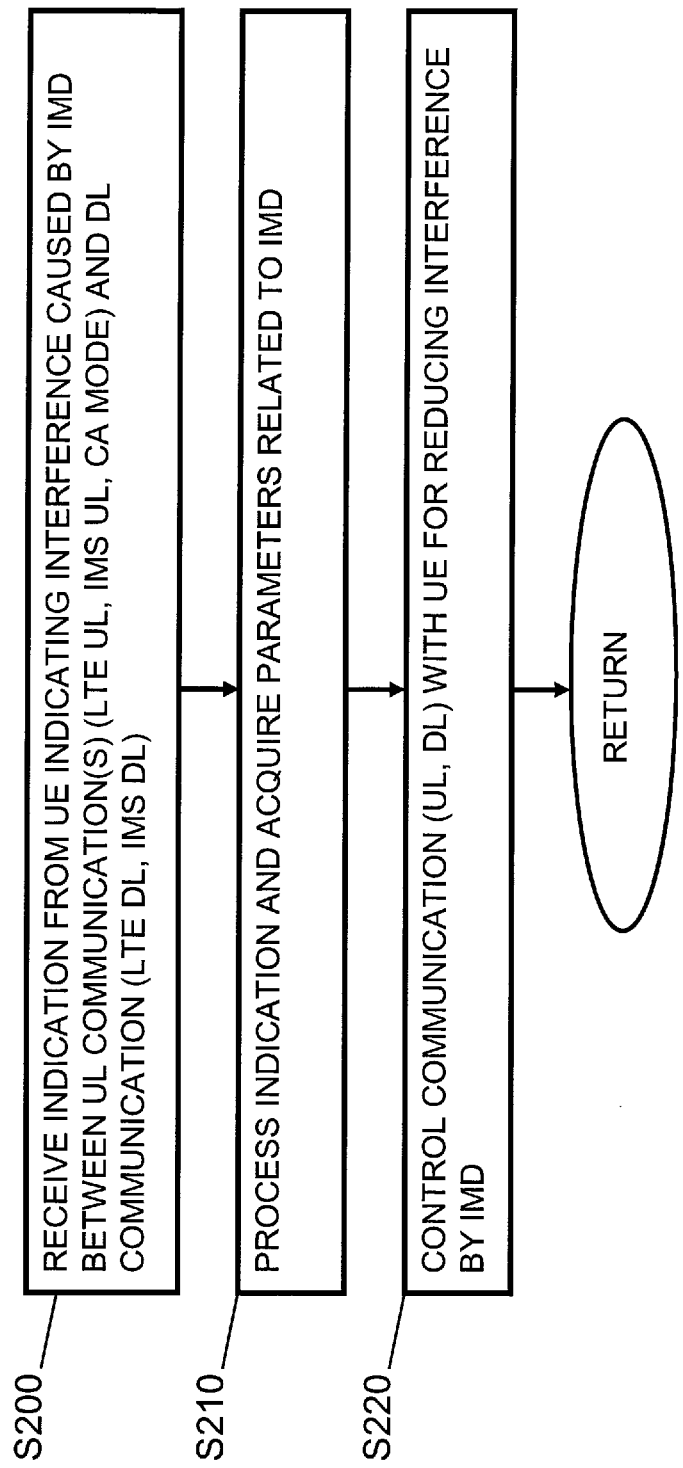
FIG. 7 shows a flowchart illustrating an interference control procedure conducted by a communication network control element according to some examples of embodiments of the invention.

FIG. 7 shows a flowchart illustrating a processing for conducting an interference control procedure in a communication network as shown e.g. in FIG. 1 according to some examples of embodiments of the invention.

Specifically, FIG. 7 shows a processing for controlling a corresponding communication and interference on the network side. The method in FIG. 7 is executed, according to some example embodiments of the invention, in a communication network control element like the eNB 20.

In step S200, the eNB 20 receives an indication element for indicating that an interference situation caused by IMD exists for the sending UE CUE 10) in a set of first communications performed on at least a first and a second frequency and a second communication performed on a third frequency. The indication element corresponds to that described in connection with FIG. 6, for example, and is received by IDC signaling or separate signaling, as described above, according to some examples of embodiments of the invention.

In step S210, the indication element is processed so as to acquire information and parameters related to the interference situation caused by IMD.

In step S220, the eNB conducts a communication control procedure on the basis of the parameters derived from the indication in order to reduce or avoid the interference by IMD. That is, the communication with the UE 10 is controlled by suitably changing communication properties for reducing the interference caused by IMD. For example, according to some examples of embodiments of the invention, the controlling of the communication with the communication element on the basis of the acquired parameters comprises at least one of re-scheduling a downlink transmission in the communication with the communication element with a changed modulation and coding scheme, configuring a communication with the communication element as a communication of a secondary cell avoiding a simultaneous transmission with an interfering communication, controlling a transmission power setting for achieving a tradeoff between communications for reducing interference, re-scheduling a downlink transmission in the communication with the communication element to resources determined to be not interfered, de-activating a communication with the communication element, and re-scheduling a communication with the communication element on the basis of an alternative scheduling pattern for data transmission via the set of first communications, the alternative scheduling pattern being used for mitigating the interference by the intermodulation distortion.

It is to be noted that according to some examples of embodiments of the invention the set of first communications and the second communication are communication as described in connection with scenario 1 and 2, for example.

Figure 8:
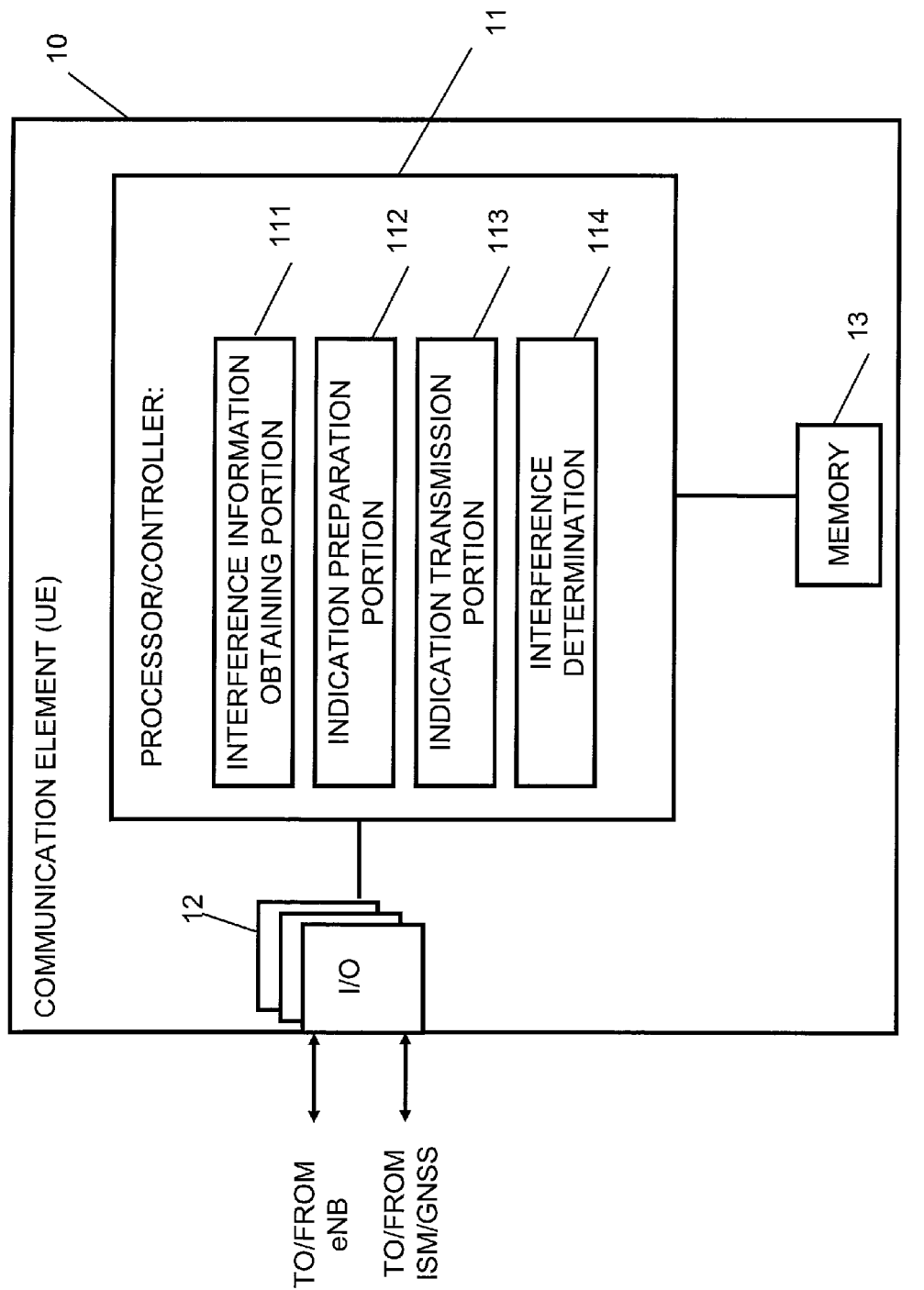
FIG. 8 shows a block circuit diagram of a communication element including processing portions conducting functions according to some examples of embodiments of the invention.

In FIG. 8, a block circuit diagram illustrating a circuitry indicating a configuration of a communication element, such as the UE 10, is shown which is configured to implement the communication control procedure as described in connection with examples of some embodiments the invention. That is, a circuitry is shown which comprises at least one processor and at least one memory including computer program code the at least one memory and the computer program code being configured to, with the at least one processor, cause the UE 10 to perform functions described below, for example by executing a corresponding algorithm. It is to be noted that the communication element or UE 10 shown in FIG. 8 may comprise several further elements or functions besides those described herein below, which are omitted for the sake of simplicity as they are not essential for understanding the invention. Furthermore, even though reference is made to an UE, the communication element may be also another terminal device having a similar function, such as a modem chipset, a chip, a module etc., which can also be part of an UE or attached as a separate element to a UE, or the like.

The communication element or UE 10 may comprise a processing function or processor 11, such as a CPU or the like, which executes instructions given by programs or the like related to the communication control procedure. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denotes transceiver or input/output (I/O) units connected to the processor 11. The I/O unit 12 may be used for communicating with a communication network control element like eNB 20 and for communicating with a transceiver of another (e.g. non-3GPP) network, like an ISM or GNSS network. The I/O unit 12 may be a combined unit comprising communication equipment towards several network elements, or may comprise a distributed structure with a plurality of different interfaces for different network elements (for example as shown in FIG. 2). Reference sign 13 denotes a memory usable, for example, for storing data and programs to be executed by the processor 11 and/or as a working storage of the processor 11.

The processor 11 is configured to execute processing related to the above described communication control procedure. In particular, the processor 11 comprises a sub-portion 111 usable as a processing portion for obtaining information about an interference situation. The portion 111 may be configured to perform a processing according to step S100 of FIG. 6, for example. Furthermore, the processor 11 comprises a sub-portion 112 usable as a portion for preparing an indication regarding the interference situation (e.g. in case of IMD caused interference). The portion 112 may be configured to perform a processing according to step S110 of FIG. 6, for example. In addition, the processor 11 comprises a sub-portion 113 usable as a processing portion for causing transmission of the indication. The portion 113 may be configured to perform a processing according to step S120 of FIG. 6, for example. Moreover, the processor 11 comprises a sub-portion 114 usable as a processing portion for determining (or calculating/deciding) that an interference situation caused by IMD is present. The portion 114 may be configured to perform the above described processing regarding interference determination. It is to be noted that the information obtained in sub-portion 111 is provided, according to some examples of embodiments of the invention, by sub-portion 114, or according to some other examples of embodiments of the invention by another source being capable to provide this information (e.g. another chip, processor etc.).

Figure 9:
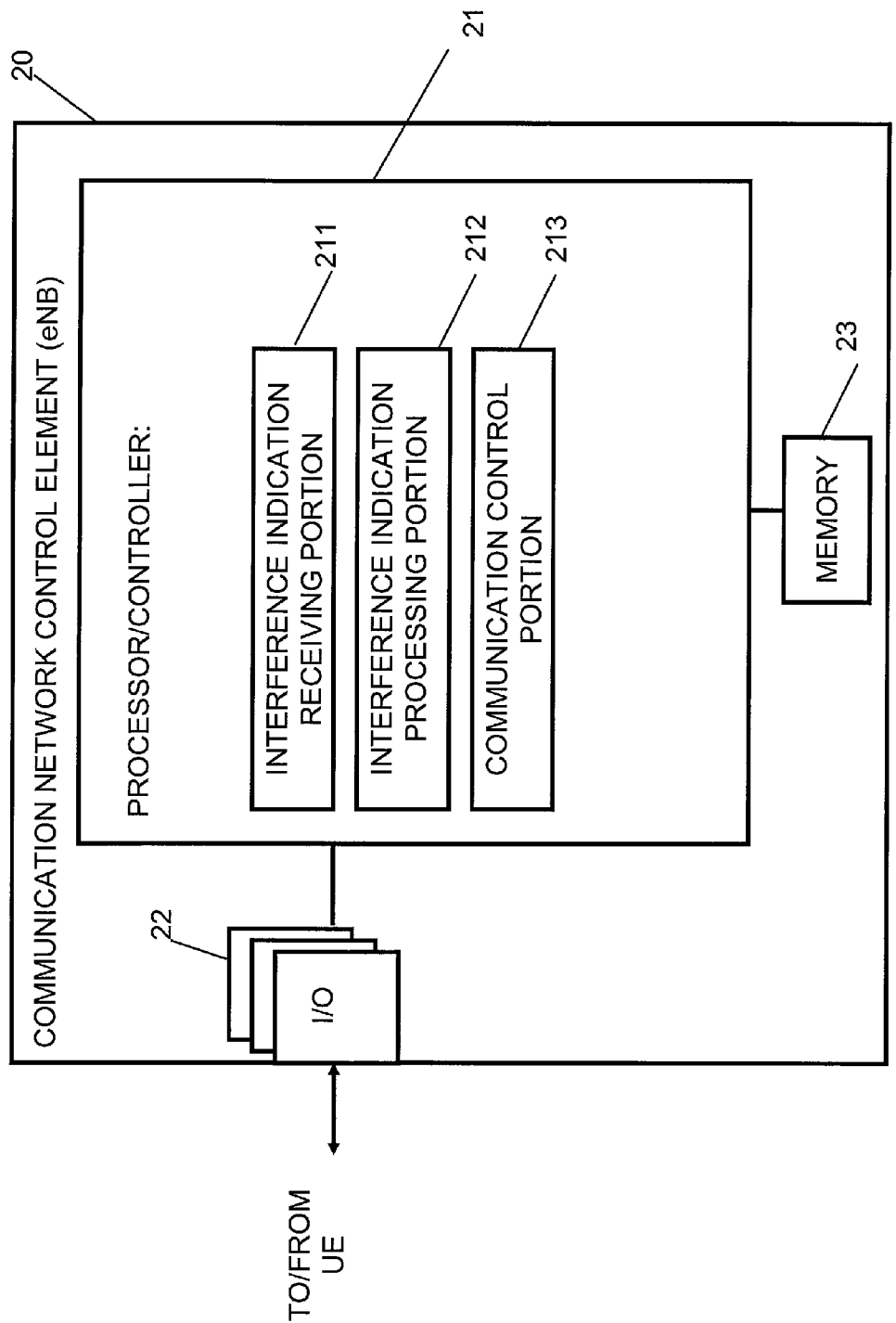
FIG. 9 shows a block circuit diagram of a communication network control element including processing portions conducting functions according to some examples of embodiments of the invention.

In FIG. 9, a block circuit diagram illustrating a circuitry indicating a configuration of a communication network control element, such as the eNB 20, is shown which is configured to implement the communication controlling procedure as described in connection with the some example embodiments of the invention. That is, a circuitry is shown which comprises at least one processor and at least one memory including computer program code the at least one memory and the computer program code being configured to, with the at least one processor, cause the eNB 20 to perform functions described below, for example by executing a corresponding algorithm. It is to be noted that the communication network control element or eNB 20 shown in FIG. 9 may comprise several further elements or functions besides those described herein below, which are omitted for the sake of simplicity as they are not essential for understanding the invention. Furthermore, even though reference is made to an eNB, the communication network control element may be also another device having a similar function, such as a modem chipset, a chip, a module etc., which can also be part of a BS or eNB or attached as a separate element to a BS or eNB, or the like.

The communication network control element or eNB 20 may comprise a processing function or processor 21, such as a CPU or the like, which executes instructions given by programs or the like related to the communication control procedure. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 22 denote a transceiver or input/output (I/O) unit connected to the processor 21. The I/O unit 22 may be used for communicating with a communication element like the UE 10. The I/O unit 22 may be a combined unit comprising communication equipment towards several network elements, or may comprise a distributed structure with a plurality of different interfaces for different network elements. Reference sign 23 denotes a memory usable, for example, for storing data and programs to be executed by the processor 21 and/or as a working storage of the processor 21.

The processor 21 is configured to execute processing related to the above described communication control procedure. In particular, the processor 21 comprises a sub-portion 211 as a processing portion which is usable for receiving from a UE an interference indication related to IMD caused interferences. The portion 211 may be configured to perform a processing according to step S200 of FIG. 7, for example. Furthermore, the processor 21 comprises a sub-portion 212 usable as a portion for processing the indication and for acquiring parameters related to the interference by IMD. The portion 212 may be configured to perform processing according to step S210 of FIG. 7, for example. In addition, the processor 21 comprises a sub-portion 213 usable as a processing portion for conducting a control in communications to and from the UE sending the indication for reducing the interference. The portion 213 may be configured to perform processing according to step S220 of FIG. 7, for example.

According to some further examples of embodiments of the invention, there is provided an apparatus comprising interference information obtaining means for obtaining an information that an interference caused by an intermodulation distortion produced by a set of first communications performed on at least a first and a second frequency and a second communication performed on a third frequency is present, indication element preparation means for preparing an indication element for indicating that an interference situation caused by intermodulation distortion exists, and transmission means for causing transmission of the indication element to a communication network in which at least one of the set of first communications and the second communication is conducted.

In addition, according to some further examples of embodiments of the invention, there is provided an apparatus comprising receiving means for receiving an indication element for indicating that an interference situation caused by intermodulation distortion exists for a communication element communicating via a set of first communications performed on at least a first and a second frequency and a second communication performed on a third frequency, processing means for processing the indication element for acquiring parameters related to the interference situation caused by the intermodulation distortion, and controlling means for controlling, on the basis of the acquired parameters, a communication with the communication element by changing communication properties for reducing the interference caused by intermodulation distortion.

For the purpose of the some embodiments of the present invention as described herein above, it should be noted that

- an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
- usable communication networks and transmission nodes may be or comprise any device, apparatus, unit or means by which a station, entity or other user equipment may connect to and/or utilize services offered by the access network; such services include, among others, data and/or (audio-) visual communication, data download etc.;
- a user equipment or communication network element may be any device, apparatus, unit or means which is usable as a user communication device and by which a system user or subscriber may experience services from an access network, such as a mobile phone, a wireless mobile terminal, a personal digital assistant PDA, a smart phone, a personal computer (PC), a laptop computer, a desktop computer or a device having a corresponding functionality, such as a modem chipset, a chip, a module etc., which can also be part of a UE or attached as a separate element to a UE, or the like, wherein corresponding devices or terminals may be, for example, an LTE, an LTE-A, a TETRA (Terrestrial Trunked Radio), an UMTS, a GSM/EDGE etc. smart mobile terminal or the like;
- method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Furthermore, as used in this application, the terms, device' or, circuitry' refer to all of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory (or memories) working together to cause an apparatus, such as a mobile phone or server, to perform various functions) and (c) circuits, such as a microprocessor (or plural microprocessors) or a portion of a microprocessor (or plural microprocessors), that requires/require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

As described above, there is proposed a mechanism for controlling communications conducted in multiple frequency bands, in particular for controlling interference caused by intermodulation distortion. When the UE obtains information that an interference caused by an intermodulation distortion produced by a set of first communications performed on at least a first and a second frequency and a second communication performed on a third frequency is present, an indication to the eNB for indicating that an interference situation caused by intermodulation distortion exists. The eNB receiving this indication is enabled to acquire parameters related to the interference situation caused by the intermodulation distortion, and to control, on the basis of the acquired parameters, a communication with the UE by changing communication properties for reducing the interference caused by intermodulation distortion.

Although the present invention has been described herein before with reference to particular embodiments thereof, the present invention is not limited thereto and various modifications can be made thereto.

What is claimed is:

1. A method, comprising:
   determining, by circuitry, whether an interference is present in at least one of a first communication and a second communication, the interference caused by an intermodulation distortion produced by the first communication and the second communication, the first communication performed on at least a first frequency and a second frequency and the second communication performed on a third frequency;
   determining, when the interference is present, whether the interference is caused by the intermodulation distortion between the first communication and the second communication;
   providing, when the interference is determined to be caused by the intermodulation distortion, information for preparing an indication element that indicates an interference situation caused by the intermodulation distortion;
   preparing the indication element according to the information; and
   transmitting the indication element to a communication network in which at least one communication of the first communication and the second communication is conducted.

2. The method according to claim 1, wherein the indication element includes one of
   an in-device co-existence indication signaling that indicates, to the communication network, a capability to communicate via at least one further communication path being different to the communication network, and
   a separate signaling that indicates, to the communication network, the presence of the interference situation.

3. The method according to claim 1, wherein the indication element comprises at least one of
   a first information element specifying a cause of the intermodulation distortion,
   a second information element specifying a combination of the communications causing the intermodulation distortion,
   a third information element specifying a frequency or a frequency range of the intermodulation distortion,
   a fourth information element specifying a range of resource blocks of the intermodulation distortion,
   a fifth information element specifying a frequency range representing a source of the intermodulation distortion, and
   a sixth information element specifying an alternative scheduling pattern for data transmission via the first communication and the second communication, the alternative scheduling pattern used for mitigating the interference caused by the intermodulation distortion.

4. The method according to claim 1, wherein determining whether the interference is caused by the intermodulation distortion comprises:
calculating a first interference level caused at an original setting of communication properties of the first communication and the second communication;
modifying the setting of the communication properties of the first communication and the second communication;
calculating a second interference level caused at the modified setting of the communication properties of the first communication and the second communication; and
comparing the first interference level and the second interference level, wherein
the result of the comparison is used for determining whether the interference is caused by the intermodulation distortion.

5. The method according to claim 4, wherein the modifying of the setting of the communication properties of the first communication and the second communication comprises one of
reducing a transmission power for an uplink transmission via at least one communication of the first communication and the second communication;
delaying the uplink transmission via the one communication of the first communication and the second communications; and
selecting a different channel for the uplink transmission via the one communication of the first communication and the second communication.

6. The method according to claim 1, wherein
the first communication comprises at least two uplink communications via a cellular wireless communication network and the second communication comprises a downlink communication via a communication network different from the cellular wireless communication network, or
the first communication comprises at least one uplink communication and one downlink communication via a cellular wireless communication network and the second communication comprises an uplink communication via a communication network different from the cellular wireless communication network.

7. The method according to claim 1, wherein
the circuitry is included in at least one of a terminal device or user equipment,
the at least one of the terminal device or the user equipment is located in the communication network and which communicates by the first communication with a communication network control element, and
the communication network control element comprises at least one of a base station of a cellular network, an evolved node B of a Long Term Evolution or Long Term Evolution Advanced communication network, and an access node, which controls the communication network, and wherein the second communication is at least one of an industrial, scientific and medical communication and a global navigation satellite system communication.

8. The method according to claim 7, wherein the user equipment is a mobile phone.

9. An apparatus, comprising:
circuitry configured to
determine whether an interference is present in at least one of a first communication and a second communication, the interference caused by an intermodulation distortion produced by the first communication and the second communication, the first communication performed on at least a first frequency and a second frequency and the second communication performed on a third frequency;
determine, when the interference is present, whether the interference is caused by the intermodulation distortion between the first communication and the second communication;
provide, when the interference is determined to be caused by the intermodulation distortion, information for preparing an indication element that indicates an interference situation caused by the intermodulation distortion;
prepare the indication element according to the information; and
transmit the indication element to a communication network in which at least one communication of the first communication and the second communication is conducted.

10. The apparatus according to claim 9, wherein the indication element includes one of
an in-device co-existence indication signaling element that indicates, to the communication network, a capability to communicate via at least one further communication path being different to the communication network, and
a separate signaling that indicates, to the communication network, the presence of the interference situation.

11. The apparatus according to claim 9, wherein the indication element comprises at least one of
a first information element specifying a cause of the intermodulation distortion,
a second information element specifying a combination of the communications causing the intermodulation distortion,
a third information element specifying a frequency or a frequency range of the intermodulation distortion,
a fourth information element specifying a range of resource blocks of the intermodulation distortion,
a fifth information element specifying a frequency range representing a source of the intermodulation distortion, and
a sixth information element specifying an alternative scheduling pattern for data transmission via the first communication and the second communication, the alternative scheduling pattern used for mitigating the interference caused by the intermodulation distortion.

12. The apparatus according to claim 9, wherein to determine whether the interference is caused by the intermodulation distortion produced, the circuitry is configured to
calculate a first interference level caused at an original setting of communication properties of the first and the second communication;
modify the setting of the communication properties of the first communication and the second communication;
calculate a second interference level caused at the modified setting of the communication properties of the first communication and the second communication; and
compare the first interference level and the second interference level, wherein circuitry uses the result of the comparison to determine whether the interference is caused by the intermodulation distortion.

13. The apparatus according to claim 12, wherein modify the setting of the communication properties of the first communication and the second communication, the circuitry is configured to one of
reduce a transmission power for an uplink transmission via at least one communication of the first communication and the second communication,
delay the uplink transmission via one communication of the first communication and the second communication, and
select a different channel for the uplink transmission via one communication of the first communication and the second communication.

14. The apparatus according to claim 9, wherein
the first communication comprises at least two uplink communications via a cellular wireless communication network and the second communication comprises a downlink communication via a communication network different from the cellular wireless communication network, or
the first communication comprises at least one uplink communication and one downlink communication via a cellular wireless communication network and the second communication comprises an uplink communication via a communication network different from the cellular wireless communication network.

15. The apparatus according to claim 9, wherein the circuitry is included in least one of a terminal device or user equipment,
the at least one of the terminal device or the user equipment is located in the communication network and which communicates by the first communication with a communication network control element, and
the communication network control element comprises at least one of a base station of a cellular network, an evolved node B of a Long Term Evolution or Long Term Evolution Advanced communication network, and an access node, which controls the communication network and wherein the second communication is at least one of an industrial, scientific and medical communication and a global navigation satellite system communication.

16. The apparatus according to claim 15, wherein the user equipment is a mobile phone.

17. An apparatus, comprising:
circuitry configured to
receive an indication element that indicates an interference situation caused by an intermodulation distortion produced by a user equipment communicating via a first communication performed on at least a first and a second frequency and a second communication performed on a third frequency;
process the indication element to acquire parameters related to the interference situation; and
control, based on the acquired parameters, a communication with the user equipment by changing communication properties to reduce the interference caused by the intermodulation distortion, wherein
the user equipment transmits the indication element, and
the user equipment prepares the indication information according to information provided when the interference is determined, by the user equipment, to be caused by the intermodulation distortion.

18. The apparatus according to claim 17, wherein the the indication element includes one of
an in-device co-existence indication signaling that indicates a capability of the communication element to communicate via at least one further communication path being different to the communication network, and
a separate signaling that indicates the presence of the interference situation.

19. The apparatus according to claim 17, wherein the apparatus is a base station.

20. The apparatus according to claim 17, wherein the indication element comprises at least one of
a first information element specifying a cause of the intermodulation distortion,
a second information element specifying a combination of the communications causing the intermodulation distortion,
a third information element specifying a frequency or a frequency range of the intermodulation distortion,
a fourth information element specifying a range of resource blocks of the intermodulation distortion,
a fifth information element specifying a frequency range representing a source of the intermodulation distortion, and
a sixth information element specifying an alternative scheduling pattern for data transmission via the first communication and the second communication, the alternative scheduling pattern used for mitigating the interference caused by the intermodulation distortion.

* * * * *